Oct. 24, 1939.  A. P. ARMINGTON ET AL  2,177,236
TRAILER VEHICLE DOLLY
Filed March 6, 1937   3 Sheets-Sheet 1

INVENTORS.
ARTHUR P. ARMINGTON.
WALTER F. DOUBLE.
BY Brockett, Hyde, Higley & Meyer ATTORNEYS Patented Oct. 24, 1939

2,177,236

UNITED STATES PATENT OFFICE 2,177,236

TRAILER VEHICLE DOLLY

Arthur P. Armington, Willoughby, and Walter F. Double, Wickliffe, Ohio; Katherine Stewart Armington, executrix of said Arthur P. Armington, deceased, assignors to The Euclid Road Machinery Company, Euclid, Ohio, a corporation of Ohio Application March 6, 1937, Serial No. 129,436

2 Claims. (Cl. 280—33.1)

This invention relates to dolly means for a trailer vehicle, which may be such as is employed in highway transportation coupled to a tractor or other draft vehicle, the trailer having a pair of rear wheels and having its front end supported by the tractor, so as to form therewith a 6-wheel mobile unit articulated by a king pin in a so-called fifth wheel arrangement located upon the tractor adjacent the rearward pair of tractor wheels, which are the drivers.

The dolly is located at a forward part of the trailer for adjustment only in the vertical longitudinal plane, and its purpose is to provide temporary support for the trailer so that the latter may be unhitched from the tractor as during loading, unloading and other standby periods, so as to release the tractor for service at the time with other similar trailers.

General objects of the present invention are to provide an inexpensive reliable dolly arrangement for such purpose.

Particularly an object of the invention is to provide an arrangement permitting maximum possible forward location of the dolly in supporting position, so that more of the trailer load will be carried by the rear wheels of the trailer and less load by the dolly than has heretofore been accomplished in the art, whereby the dolly may be of less weight than heretofore.

The invention contemplates a supporting location of the dolly relative to the trailer load, substantially the same as that of the tractor fifth wheel when the trailer is hitched to the tractor, and a further object of the invention is to provide in a novel and simplified manner for movement of the dolly upon the trailer between such supporting position and a travelling position wherein the dolly is out of the way of the tractor. Still a further object is to provide for automatic movement of the dolly between such positions, responsive to relative coupling movement between tractor and trailer, both for labor saving advantages and for safety in case of accidental uncoupling or breakage at the hitch.

An important feature of the invention is means for automatically and positively locking the dolly in supporting position, and for automatic release of the locking means responsive to engagement by the tractor. Another important novel feature is arrangement for movement of the dolly to travelling position and support thereof in such position, directly by the tractor.

Figures 1, 3, 4:
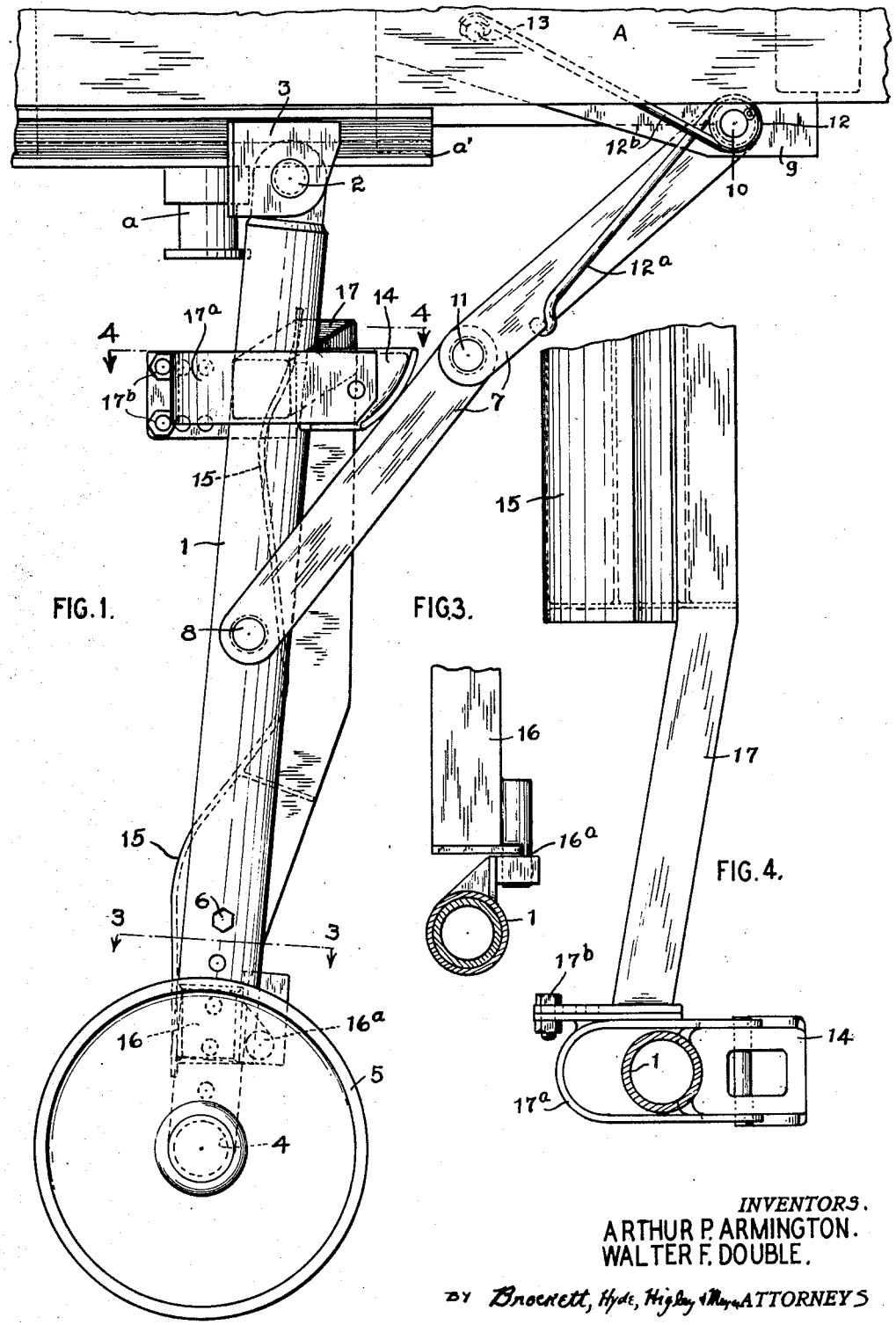
Figure 2:
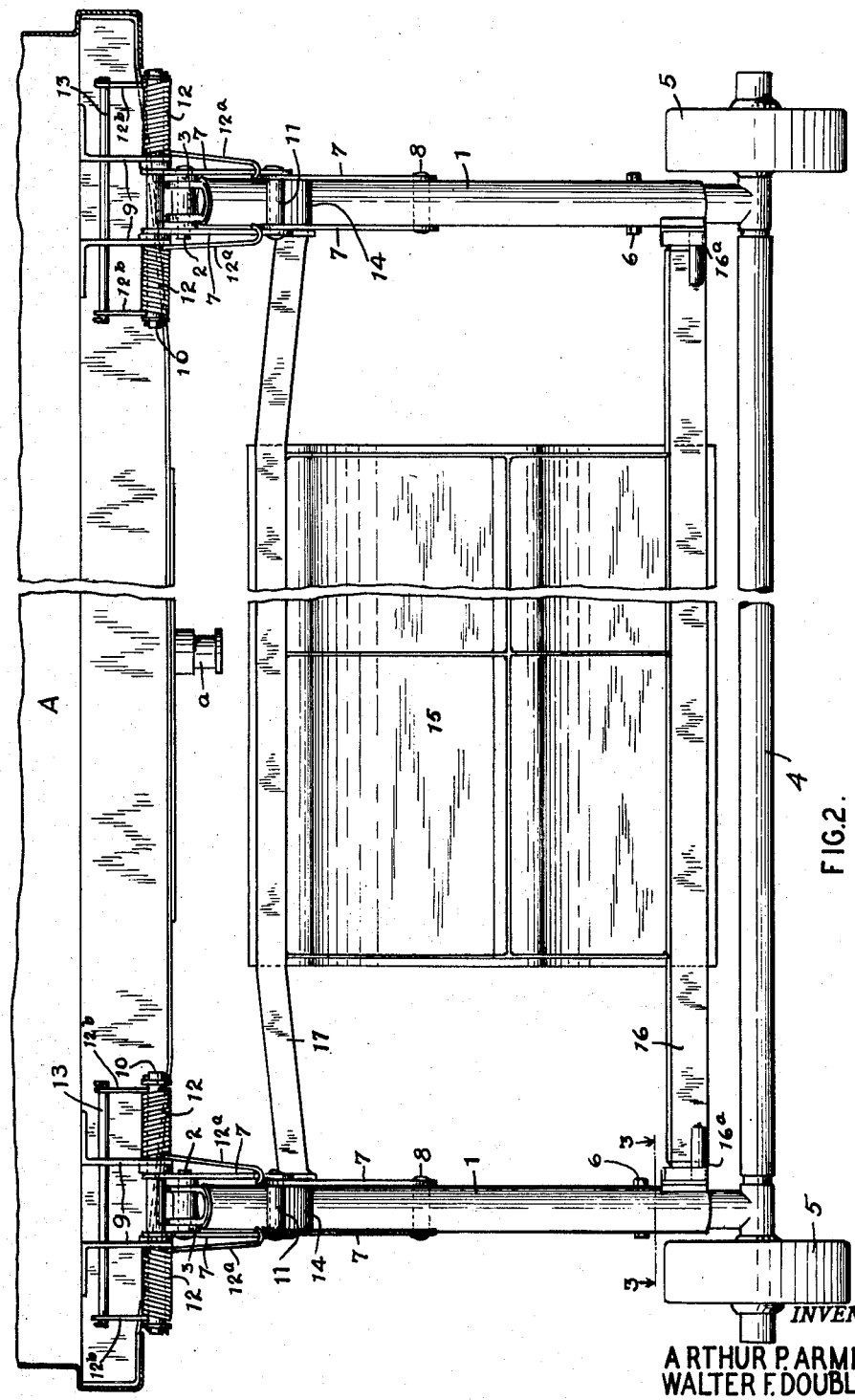
Figure 5:
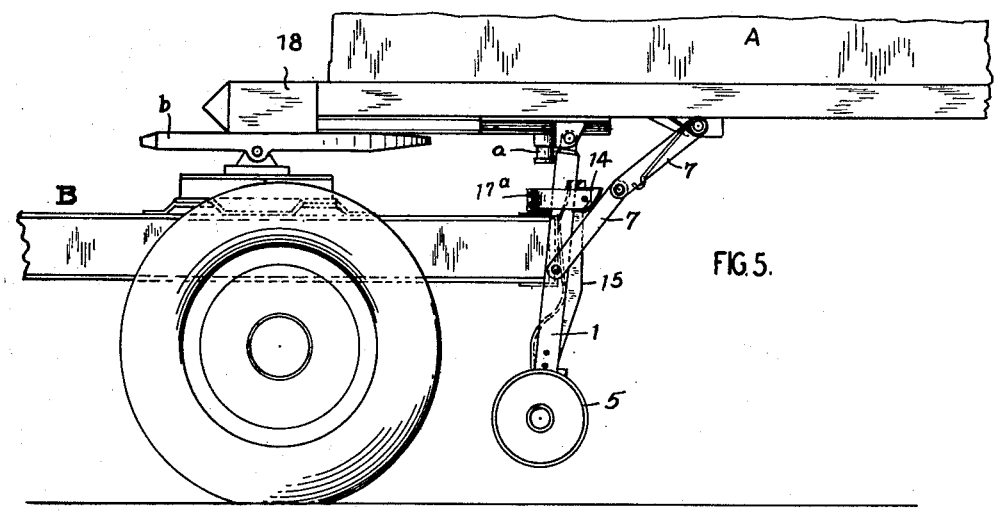
Figure 6:
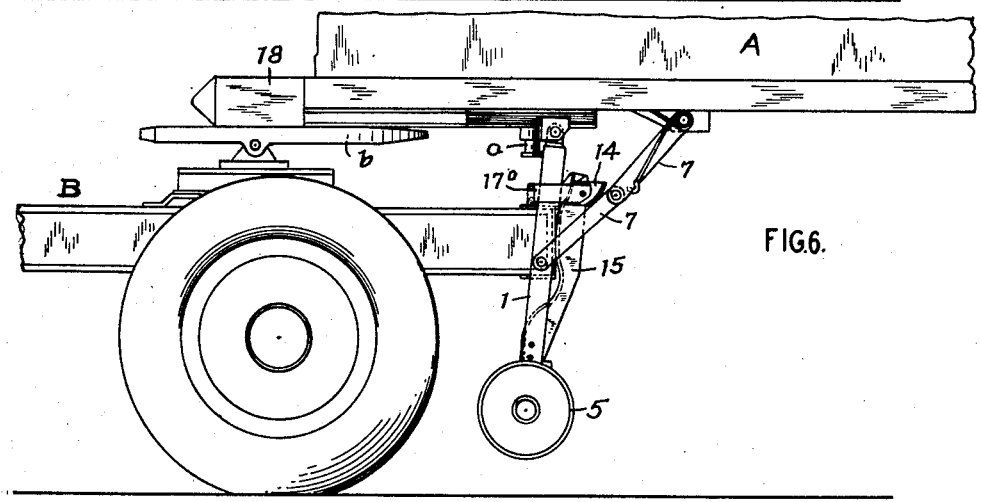
Figure 7:
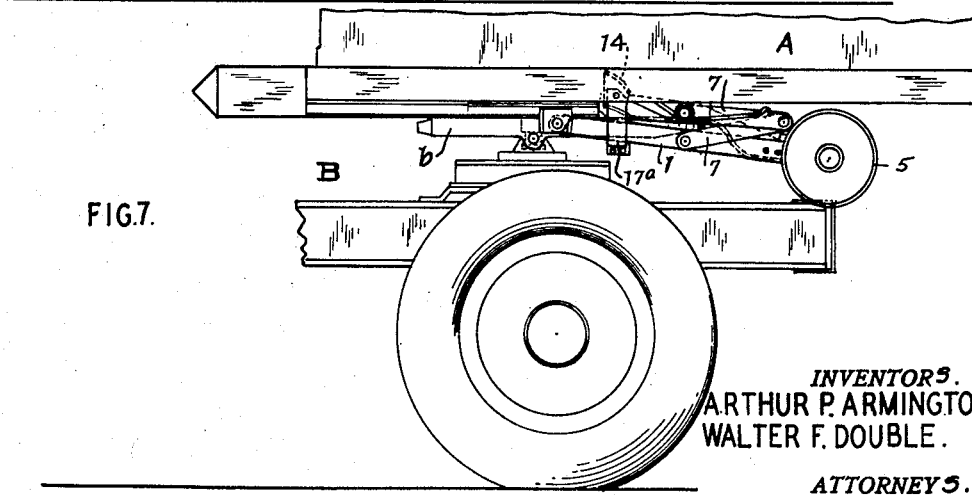

The exact nature of this invention together with further objects and advantages thereof will be apparent from the following description taken in connection with the accompanying drawings, in which Figs. 1 and 2 are side and rear elevations respectively of the dolly embodying the invention, locked in supporting position; Figs. 3 and 4 are sectional details as in the planes of lines 3—3 and 4—4 respectively, in Figs. 1 and 2; Figs. 5, 6 and 7 are sequential views in side elevation, illustrating the manner of automatic actuation of the dolly by the tractor as will appear.

With reference now to the drawings and first to Figs. 1 to 4 thereof, A represents generally a forward portion of a trailer vehicle facing toward the left in Fig. 1, having a king pin $a$ and such suitable frame and body members as indicated or necessary.

The dolly may be considered as having three principal parts, a main unit, and control means for the main unit and including means for locking the unit in supporting position.

The main unit is mounted upon the trailer for swinging movement between a generally upright supporting position and a generally horizontal travelling position, about an axis closely adjacent that of the king pin $a$. As shown the main unit comprises a pair of tubular column members 1, each connected at one end to the trailer A as by a pin 2 carried by suitable brackets 3, the pins 2 being disposed transversely of the vehicle in alignment with each other. The opposite ends of the column members 1 are interconnected by an axle member 4 carrying wheels 5. The column members 1 are preferably made adjustable as to length, as telescopically, as illustrated in the drawings, so that by suitable selection of openings for the bolts 6 the main unit may have adjustment dependent upon the height of the tractor which is to serve the trailer vehicle. It will be apparent that the main unit described may be swung about the axis of the pins 2 between the supporting position illustrated in Figs. 1 and 2, rearwardly of the trailer, counterclockwise in Fig. 1 to a horizontal position upon the trailer.

For locking of the main unit in supporting position, pairs of toggle links 7 of equal length are associated with each column 1. Each pair of links includes a lower link pinned to its column member 1 as at 8, an upper link connected to a bracket 9 mounted on the trailer frame A, as by pin 10, a pin 11 interconnecting the links to form the knuckle joint of the toggle. The links are preferably of such length as to permit swinging of the main unit to a position somewhat forward of the vertical, in supporting position of the unit, as illustrated in Fig. 1, so that the load supported upon the dolly will not tend to move the main unit toward travelling position.

A torsion spring 12, conveniently mounted upon the corresponding pin 10 which extends beyond its brackets 9 for the purpose, is provided for each toggle, the spring having an arm $12a$ bearing against the near toggle link 7, and an arm $12b$ bearing against a pin 13 fixed on the trailer as illustrated. The spring arrangement is such that, when the main unit of the dolly is in travelling position, the springs 12 will be effective upon the toggles, yieldably urging them toward straightened position and consequently yieldably urging the dolly toward supporting position; and when the dolly is in supporting position as illustrated in Fig. 1, the springs will yieldably maintain the toggles forwardly slightly beyond straightened position.

Stops 14 are arranged on the columns 1 to fix such forward positioning of the toggle knuckles, whereby when the parts are positioned as in Fig. 1 the main unit of the dolly will be positively locked against motion in either direction about its pins 2.

Means are provided for breaking the toggle joints to unlock the main unit from supporting position, for moving the main unit rearwardly to travelling position, and for there supporting the main unit—all automatically through engagement by a tractor.

Such means comprises a member 15 preferably of substantial area as indicated, mounted between the column members 1, adjacent its lower edge by a transverse member 16, and adjacent its upper edge by a transverse member 17. The lower member 16 has hinged connection with the column members 1 as indicated at 16a, and the upper member 17 has connection with the stops 14 as by saddle members 17a extending about the corresponding column members 1. Thus the member 15 is effectively mounted for fore-and-aft movement upon the main unit about the transverse axis defined by the parts at 16a, such movement being limited forwardly by engagement of the stops 14 with their columns 1 and rearwardly by engagement of the saddles 17a with such column members. Preferably such movement is adjustable, as by selective positioning of the saddle members 17a upon the member 17 by bolts 17b for which a selective series of openings are provided in the member 17 as indicated in Figs. 1 and 4.

The proportioning, arrangement and adjustment of the parts is such that movement of the member 15 rearwardly will move the stops 14 against the toggles to break the joints of the latter, and location of the member 15 is such that it will be engaged by a rearward part of a tractor, such as the extremity of the tractor flame.

Such tractor is indicated generally at B in Figs. 5, 6 and 7, and the tractor fifth wheel apparatus includes the usual tilting plate b mounted for turning motion about a vertical axis, recessed and otherwise arranged to receive, position, and lock the king pin a of the trailer for coupling between the vehicles, the tilting plate b being balanced as by gravity to a rearwardly tilting disposition so as to act as a cam to raise the forward end of the trailer as the tractor backs into coupled position relative thereto,—all as common practice in the art.

The trailer A has a part 18 rigidly associated with its frame and extending forwardly sufficiently to transfer the load of the forward trailer end from the dolly onto the tilting plates b of the tractor, before the tractor engages the member 15 of the dolly, so that the dolly remains in locked position until all of the load of the forward end of the trailer has been assumed by the tractor as illustrated in Fig. 5.

Assuming the parts, therefore, positioned as in Fig. 5, the dolly being locked in supporting position but without carrying any of the trailer load, continued rearward motion of the tractor B will move the member 15 rearwardly and cause the stop members 14 to break the joints of the toggle members 7.

Continued rearward motion of the tractor against the trailer will cause the member 15 to move the main unit of the dolly with it, rearwardly and upwardly to the travelling position illustrated in Fig. 7, the member 15 then having a forward portion resting upon the rearward portion of the tilting plate b of the tractor so that the dolly is maintained in such travelling position supported directly upon the tractor.

The front face of the member 15 engageable by the tractor will be observed as contoured for the purposes described, with a recessed portion above a projecting portion when the dolly is in supporting position, so that the tractor may cam the dolly to travelling position and there the forward portion of the member 15 which supports the dolly will lie on the tilting plate b of the tractor rearwardly of the trailer block a' which has a load-bearing face about the king pin a.

In travelling position the parts of the dolly are maintained against rattling by the springs 12 which are then under their maximum tension.

Automatic movement of the dolly from supporting to travelling position having been described, it will be apparent that in uncoupling the tractor, the dolly will similarly automatically resume supporting position, the springs 12 assisting gravity in the early stages of the operation, moving the main dolly unit somewhat forward of vertical position and there locking it by the toggles in supporting position—all before the trailer load is transferred from the tractor onto the dolly.

It will be evident that similar automatic operation would follow were the tractor accidentally unhitched or were a breakage to occur in the coupling mechanism.

What we claim is:

1. A support for a trailer comprising a main unit mounted on said trailer for movement between supporting and travelling positions, means associated with said unit for locking the unit in said supporting position, and a member pivotally supported on said main unit and adapted to cooperate with said locking means to unlock said unit, from said supporting position when said member is moved by engagement with a tractor part, and arranged to thereafter rest upon a fifth wheel part of said tractor when said trailer is coupled to the tractor, to provide said unit support.

2. A suport for a trailer adapted for movement to retracted and supporting positions and including a member pivoted at one end to said trailer, toggle means connected to said member and to said trailer, means to operate said toggle comprising a member pivoted to said first member near the lower end thereof, toggle engaging means on said second member, and means carried by said second member adapted to be engaged by a rigid object so constructed and arranged to swing said second member about its pivot to break the toggle and to thereafter serve as a means to retain said support in retracted position.

ARTHUR P. ARMINGTON.
WALTER F. DOUBLE.